Feb. 26, 1924. 1,484,961
W. J. PEELLE
MACHINE FOR MAKING GASKETS AND THE LIKE
Filed June 4, 1923
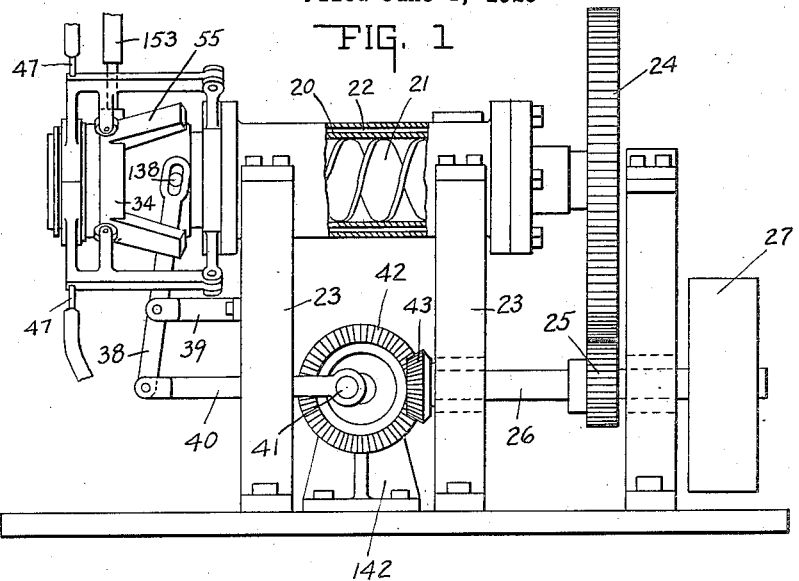
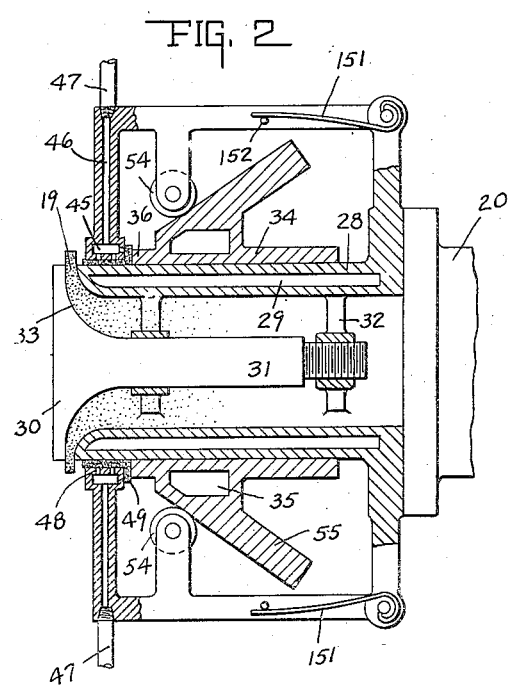 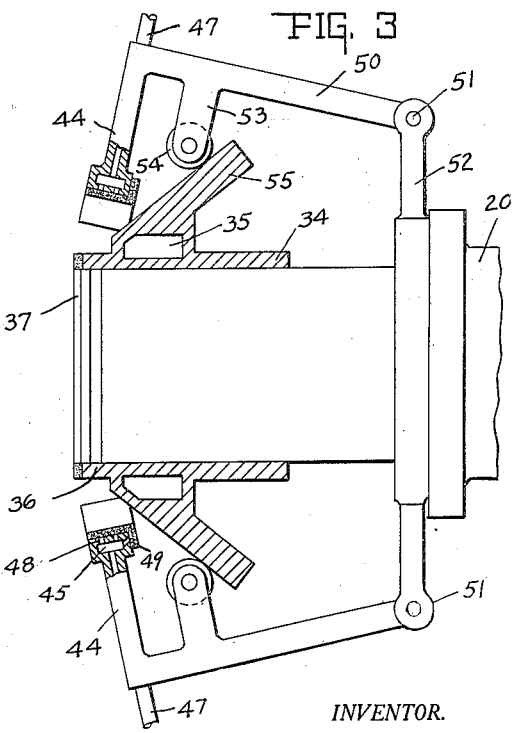
INVENTOR.
WILLIS J. PEELLE
BY
Lockwood & Lockwood
ATTORNEYS.

Patented Feb. 26, 1924.

1,484,961

UNITED STATES PATENT OFFICE.

WILLIS J. PEELLE, OF CHICAGO, ILLINOIS.

MACHINE FOR MAKING GASKETS AND THE LIKE.

Application filed June 4, 1923. Serial No. 643,240.

*To all whom it may concern:*

Be it known that I, WILLIS J. PEELLE, a citizen of the United States, and a resident of Chicago, county of Cook, and State of Illinois, have invented a certain new and useful Machine for Making Gaskets and the like; and I do hereby declare that the following is a full, clear, and exact description thereof, reference being had to the accompanying drawings, in which like numerals refer to like parts.

This invention relates to an apparatus for making gaskets and the like, regardless of whether the gaskets are applied to jar covers after they have been made or not. A co-pending application Serial No. 623,103 upon the method involved has been filed.

The chief feature of the invention consists in means for laterally extruding from a chamber containing gasket-forming material in plastic form an annular portion extending outward beyond the periphery of said chamber, and severing the extruded portion particularly by a shearing means surrounding and sliding longitudinally of said chamber, whereby a gasket ring or the like is formed.

Another feature of the invention consists in means for treating the shearing means with adhesive preventive substance so that the extruded material or gasket will not adhere thereto while being severed and so that the gaskets can be immediately handled and packed without sticking together.

The full nature of the invention will be understood from accompanying drawings and the following description and claims:

In the drawings, Figure 1 is a side elevation of the machine, parts being broken away to show detailed construction. Fig. 2 is an enlarged section of parts of the machine showing parts in position at the time the material is extruded. Fig. 3 is the same with the parts in position after the gasket or the like has been severed.

In the drawings, 20 indicates a cylinder wherein the mass of the rubber or rubber-like composition in plastic form for making the gaskets is contained. In said cylinder 20 there is a feed screw 21 which moves the composition or mass forwardly, or to the left, as shown in the drawings, through said cylinder. Said cylinder is jacketed to form a chamber 22 for receiving steam, hot water or the like, for heating the composition or rubber-like material and maintaining it in a plastic condition and at the proper temperature. This feeding cylinder 20 is stationary upon the supports 23 and the feed screw 21 is driven by a gear 24, pinion 25, shaft 26 and power pulley 27.

A cylindrical forming die 28 is removably secured to the discharge end of the cylinder 20 and it has also a jacketed chamber 29 for steam, hot water or the like for maintaining the plastic material in the desired heating condition as it is being forced through said cylindrical-forming die 28. The discharge end of said cylinder 28 is flared bell-shape, as shown in Fig. 2, and a conical disk head 30 cooperates therewith forming an annular bell-shaped discharge opening 33 for the lateral extrusion of the plastic material 19, as illustrated in Fig. 2. The disk head 30 has a stem 31 with a threaded end screwing into a bracket 32 extending diametrically in the forming cylinder 28, so that the conical disk head 30 can be adjusted to predetermine the size of the discharge opening 33 and hence the thickness of the extruded material and the gasket to be formed.

The screw 21 forces the plastic material into and through the forming cylinder 28 and outward laterally through the annular opening 33 so that the extruded material extends beyond the periphery of both the cylinder 28 and the disk head 30. Said disk head 30 and cylinder 28 have the same external diameters and are in alignment with each other.

There is a shearing member 3 surrounding and longitudinally slidable upon the cylinder 28 and the advancing or left-hand end 36 thereof is the severing end which, as it travels across the opening 33 and disk head 30, severs the gasket 37 from the mass of material, and in annular or ring form, which is the usual shape of gaskets for jar covers and the like. The severing is caused by the cooperation of the severing means 34 and the disk head 30.

The severing means 34 is kept cool by a cooling chamber 35 therein connected with a suitable source of cold fluid. The means for reciprocating the cylinder 34 consists of a bifurcated lever 38, see Fig. 1, pivoted between its ends to a bracket 39 on the adjacent standard 23. One end of the lever 38 is pivoted to the end of a connecting rod 40, which is connected with a pin 41 eccentrically positioned on the side of the beveled gear 42. Said gear is mounted on a support 142 and driven by a bevel pinion 43 on the shaft 26. The upper ends of the bifurcated lever 38 are longitudinally slotted, as shown in Fig. 2, and through said slots pins 138 extend loosely and outwardly from the cylinder 34. The feed screw 21 is constantly driven to mix and discharge the gasket forming material, as heretofore explained, and at predetermined intervals the lever 38 is actuated by the means described for operating the shearing cylinder 34 and severing the extruded portion of the material to form a gasket 37. Thus the severing will take place one time for each revolution of the gear 42.

To prevent the rubber-like material or gasket from sticking to any part of the severing means or to each other, the surfaces of the severing means with which the rubber-like material or gasket come in contact are supplied with a fluid or material which will prevent said difficulty. This is accomplished by means of a plurality of sections 44 adapted to encircle the outer end of the die cylinder 28, as shown in Fig. 2, and lie adjacent the shearing faces of the severing end 36 of the shearing member 34, as shown. There are two of said sections 44 herein shown, each semi-circular, and each of them is provided with a circular internal chamber 45 for adhesive preventive material, which is supplied thereto by a channel 46 and conduit 47 from any source of supply for said material. The adhesive preventive material may consist of water with oil in it, preferably, or powdered talc or any other suitable material. The chamber 45 is provided with a plurality of discharge orifices 48 leading to a felt pad 49 that is secured to the inner surface of the member 44 and also the side thereof adjacent the severing end 36 of the severing means 34. By this means the adhesive preventive fluid is applied to said parts and in the severing operation it is applied by the severing end of the shearing means 34 to the periphery of the disk head 30, whereby it is kept moistened and, therefore, the surfaces of the two severing means 36 and 30 will be prevented from adhering to the rubber-like material or the gasket and yet the advancing side of the gasket and its outer periphery are not coated with said material, whereby the gasket can be secured immediately and while heated to a jar cover or the like.

The moistening means described above is supported upon levers 50 pivoted at 51 to standards 52, as shown in Figs. 2 and 3. An arm 53 extends inwardly from each lever 50 and carries a roller 54 adapted to travel on an inclined surface of a projection 55 from the periphery of the die cylinder 34. When the shearing cylinder 34 is moved outward or to the left from the position shown in Fig. 2 to that shown in Fig. 3, for severing the gasket, it forces the levers 50 away from the cylinder 34 to the inclined positions shown in Fig. 3, which withdraws the moistening heads 44 from the die cylinder 28 and out of the path of the shearing cylinder 34. As the shearing cylinder returns, said levers 50 and moistening heads 44 are moved inward to the moistening position shown in Fig. 2 by springs 151 which are coiled about the stationary pivots 51 and project along the side of the levers 50 and rest upon the pins 152. There is also a conduit 153 leading from some source of supply to the chamber 35 in the shearing cylinder 34 for supplying cold water thereto for keeping said cylinder cool.

Thus the gaskets can be rapidly formed and will not adhere to the severing means or to each other in handling or packing them.

The invention claimed is:

1. In a machine for forming sealing gaskets and the like, the combination of a cylindrical means adapted to contain a mass of rubber-like material in plastic condition, means for laterally extruding a portion of said rubber-like material from said mass in annular form, and means for severing said laterally extruded portion of the rubber-like material to form a sealing gasket.

2. In a machine for forming sealing gaskets and the like, the combination of a cylindrical die for containing a mass of gasket-forming material in plastic form, means mounted therein for forming a laterally-extending annular outlet, means for forcing the material in said cylinder outward laterally, and annular severing means movable longitudinally of said cylindrical die for severing the extruded portion of said material to form a gasket and the like.

3. In a machine for forming sealing gaskets and the like, the combination of a cylindrical die for containing a mass of gasket-forming material in plastic form, a disk head adjustably mounted in said cylinder die adjacent the discharge end thereof, the discharge end of the die and the adjacent surface of the disk head being shaped so as to form a bell-shaped annular outlet for the lateral discharge of the gasket-forming material beyond the periphery of said members, means for forcing the material in said cylinder outward laterally, and annular severing means movable longitudinally of said cylindrical die for severing the extruded portion of said material to form a gasket and the like.

4. In a machine for forming sealing gaskets and the like, the combination of a cylindrical die for containing a mass of gasket-forming material in plastic form, a disk head adjustably mounted in said cylinder die adjacent the discharge end thereof, the discharge end of the die and the adjacent surface of the disk head being shaped so as to form a bell-shaped annular outlet for the lateral discharge of the gasket-forming material beyond the periphery of said members, means for forcing the material in said cylinder outward laterally, and annular severing means movable longitudinally of said cylindrical die for severing the extruded portion of said material to form a gasket and the like, said disk head being in alignment with said cylinder die and of the same external diameter and said severing means adapted to move upon said disk head during the severing operation.

5. In a machine for forming sealing gaskets and the like, the combination of a cylindrical die for containing a mass of gasket-forming material in plastic form, means for heating said material in said cylindrical die, means mounted therein for forming a laterally-extending annular outlet, means for forcing the material in said cylinder outward laterally, and annular severing means movable longitudinally of said cylinderical die for severing the extruded portion of said material to form a gasket and the like.

6. In a machine for forming sealing gaskets and the like, the combination of a cylindrical die for containing a mass of gasket-forming material in plastic form, means for heating said material in said cylindrical die, means mounted therein for forming a laterally-extending annular outlet, means for forcing the material in said cylinder outward laterally, annular severing means movable longitudinally of said cylindrical die for severing the extruded portion of said material to form a gasket and the like, and means for heating said severing means.

7. In a machine for forming sealing gaskets and the like, the combination of a cylindrical die for containing a mass of gasket-forming material in plastic form, means mounted therein for forming a laterally-extending annular outlet, means for forcing the material in said cylinder outward laterally, and annular severing means movable longitudinally of said cylindrical die for severing the extruded portion of said material to form a gasket and the like, said cylindrical die and severing means being provided with annular chambers for receiving heated fluid to maintain the same in heated condition.

8. In a machine for forming sealing gaskets and the like, the combination of a cylindrical die for containing a mass of gasket-forming material in plastic form, means mounted therein for forming a laterally-extending annular outlet, means for forcing the material in said cylinder outward laterally, annular severing means movable longitudinally of said cylindrical die for severing the extruded portion of said material to form a gasket and the like, and means for preventing said severing means from adhering to the gasket while severing the same.

9. In a machine for forming sealing gaskets and the like, the combination of a cylindrical die for containing a mass of gasket-forming material in plastic form, a disk head adjustably mounted in said cylinder die adjacent the discharge end thereof, the discharge end of the die and the adjacent surface of the disk head being shaped so as to form a bell-shaped annular outlet for the lateral discharge of the gasket-forming material beyond the periphery of said members, means for forcing the material in said cylinder outward laterally, annular severing means movable longitudinally of said cylindrical die for severing the extruded portion of said material to form a gasket and the like, said disk head being in alignment with said cylinder die and of the same external diameter and said severing means adapted to move upon said disk head during the severing operation, and means for applying adhesive preventive material to the severing means and the periphery of said die head to prevent the gasket from adhering thereto.

10. In a machine for forming sealing gaskets and the like, the combination of a hollow die for containing a mass of gasket-forming material in plastic form, means for heating said material in said hollow die, means mounted therein for forming a laterally-extending annular outlet, means for forcing the material in said die outward laterally, annular severing means movable longitudinally of said hollow die for severing the extruded portion of said material to form a gasket and the like, and means for applying adhesive preventive material to one side of the gasket as it is being severed to enable the gaskets to be handled and packed without sticking together.

11. In a machine for forming sealing gaskets and the like, the combination of a hollow die for containing a mass of gasket-forming material in plastic form, means mounted therein for forming a laterally-extending annular outlet, means for forcing the material in said die outward laterally, annular severing means movable longitudinally of said hollow die for severing the extruded portion of said material to form a gasket and the like, means for preventing said severing means from adhering to the gasket while severing the same, and means for simultaneously operating said severing means and said adhesive preventive applying means.

12. In a machine for forming sealing gaskets and the like, the combination of a hollow die for containing a mass of gasket-forming material in plastic form, means mounted therein for forming a laterally-extending annular outlet, means for forcing the material in said die outward laterally, annular severing means movable longitudinally of said hollow die for severing the extruded portion of said material to form a gasket and the like, means for preventing said severing means from adhering to the gasket while severing the same, and means for enabling said severing means to operate and control the time of operation of said adhesive preventing applying means.

13. In a machine for forming sealing gaskets and the like, the combination of a cylindrical die for containing a mass of gasket-forming material in plastic form, means mounted therein for forming a laterally-extending annular outlet, means for forcing the material in said cylinder outward laterally, annular severing means movable longitudinally of said cylindrical die for severing the extruded portion of said material to form a gasket and the like, adhesive preventive applying means adapted to surround said cylindrical die near the discharge end thereof and adjacent the severing end of the severing means before the severing operation, and means for removing said adhesive preventive applying means as the severing means begins to advance to sever the gasket.

14. In a machine for forming sealing gaskets and the like, the combination of a cylindrical die for containing a mass of gasket-forming material in plastic form, means mounted therein for forming a laterally-extending annular outlet, means for forcing the material in said cylinder outward laterally, annular severing means movable longitudinally of said cylindrical die for severing the extruded portion of said material to form a gasket and the like, adhesive preventive applying means adapted to surround said cylindrical die near the discharge end thereof and adjacent the severing end of the severing means before the severing operation, yielding means for holding said adhesive preventive applying means in said position, and means associated with said severing means for moving said adhesive preventive applying means out of the way as the severing means begins to advance to the severing position.

15. In a machine for forming sealing gaskets and the like, the combination of a cylindrical die for containing a mass of gasket-forming material in plastic form, means mounted therein for forming a laterally-extending annular outlet, means for forcing the material in said cylinder outward laterally, annular severing means movable longitudinally of said cylindrical die for severing the extruded portion of said material to form a gasket and the like, adhesive preventive applying means adapted to surround said cylindrical die near the discharge end thereof and adjacent the severing end of the severing means before the severing operation, a pivoted lever for supporting said adhesive preventive applying means, a spring acting on said lever for yieldingly holding said adhesive preventive applying means in said position, an arm intermediate the ends of said lever carrying a roller, and an inclined member on said severing means adapted to travel under and engage said roller and elevate and remove the adhesive preventive applying means out of the way of the severing means as the latter begins to advance to the severing position.

In witness whereof, I have hereunto affixed my signature.

WILLIS J. PEELLE.